(12) United States Patent
Wolters et al.

(10) Patent No.: US 9,239,658 B2
(45) Date of Patent: Jan. 19, 2016

(54) USER INTERFACE TECHNOLOGY FOR DISPLAYING TABLE DATA

(71) Applicant: Microsoft Corporation, Redmond, WA (US)

(72) Inventors: Nigel Christopher William Wolters, Sammamish, WA (US); Amir M. Netz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 529 days.

(21) Appl. No.: 13/652,430

(22) Filed: Oct. 15, 2012

(65) Prior Publication Data

US 2014/0108905 A1     Apr. 17, 2014

(51) Int. Cl.
G06F 17/00     (2006.01)
G06F 17/30     (2006.01)
G06F 3/048     (2013.01)
G06F 3/0481    (2013.01)
G06Q 10/10     (2012.01)

(52) U.S. Cl.
CPC .............. *G06F 3/0481* (2013.01); *G06Q 10/10* (2013.01)

(58) Field of Classification Search
CPC ..... G06F 17/246; G06F 17/212; G06F 17/24; G06F 17/211; G06F 17/245; G06F 19/26
See application file for complete search history.

(56) References Cited

U.S. PATENT DOCUMENTS

| | | | |
|---|---|---|---|
| 6,707,454 B1 | 3/2004 | Barg et al. | |
| 7,047,497 B2 | 5/2006 | Patrizio et al. | |
| 7,925,989 B2 | 4/2011 | Hofmann et al. | |
| 8,024,666 B2 | 9/2011 | Thompson | |
| 8,127,223 B2 | 2/2012 | Becerra, Sr. et al. | |
| 8,151,213 B2 | 4/2012 | Weitzman et al. | |
| 2002/0069221 A1 | 6/2002 | Rao et al. | |
| 2007/0024490 A1 | 2/2007 | Carter et al. | |
| 2009/0083614 A1 | 3/2009 | Wedekind | |
| 2010/0280759 A1* | 11/2010 | Kagan et al. | 702/19 |
| 2011/0169835 A1* | 7/2011 | Cardno et al. | 345/440 |
| 2012/0239860 A1 | 9/2012 | Atkisson et al. | |
| 2014/0294281 A1* | 10/2014 | Suzuki et al. | 382/133 |

OTHER PUBLICATIONS

"International Search Report & Written Opinion for PCT Patent Application No. PCT/US2013/064896", Mailed Date: Nov. 12, 2014, 10 Pages.

Chi, et al., "A Spreadsheet Approach to Information Visualization", In Proceedings of IEEE Symposium on Information Visualization, Oct. 21, 1997, 11 pages.

Stolte, et al., "Multiscale Visualization Using Data Cubes", In Proceedings of IEEE Transactions on Visualization and Computer Graphics, Apr. 2003, 12 pages.

"Business Intelligence Defined—Heat Maps", LogiXML, Published at least as early as May 10, 2012, 2 pages. Available at <<https://web.archive.org/web/20120510044544/http/www.logixml.com/bi-encyclopedia>>.

* cited by examiner

*Primary Examiner* — Kavita Padmanabhan
*Assistant Examiner* — Ariel Mercado
(74) *Attorney, Agent, or Firm* — Nicholas Chen; Leonard Smith; Micky Minhas

(57) ABSTRACT

The displaying of data from a table in a manner that at least some of the rows are each represented with row visualization, and in which the positioning of the row visualization conveys information regarding column values of the row. In particular, those row visualizations that correspond to rows in which one or more column values satisfy certain value characteristics are clustered within a common region. Thus, intuitive knowledge of the characteristics of the rows may be obtained by simply noticing the position of the row visualization within the user interface. In some cases, a given row visualization may have a control that may be interacted with to show a more detailed row representation, or a given region may have a control that may be interacted with to show further details regarding the rows represented within that region.

20 Claims, 8 Drawing Sheets

USER INTERFACE TECHNOLOGY FOR DISPLAYING TABLE DATA

BACKGROUND

Tables are a common way to represent information in an organized way. Tables include a grid of typically multiple rows and typically multiple columns. Each row corresponds to a certain item, whereas each column corresponds to a property. Thus, a table entry at the intersection of a particular column and row represents a property value of a property corresponding to the particular column, the property value of the item corresponding to the particular row.

Tables are also represented as data structures in a computing system, and often rendered as tables on the computer display. Conventional computer table design has focused on visual formatting, such as the changing of row colors in tables inserted into a work processing application. Other designs relate to the formatting that can occur across rows. For example, rows can be sorted by income or grouped by date. Email programs often further allow some sorting where emails can be grouped by sender. Likewise, file system user interfaces often group file system entries by date. Spreadsheets can sort rows by the values in certain columns.

BRIEF SUMMARY

At least one embodiment described herein relates to the displaying of data from a table in a manner that at least some of the rows are each represented with a row visualization, and in which the positioning of the row visualization conveys information regarding column value(s) of the row. Thus, intuitive knowledge of the characteristics of the rows may be obtained by simply noticing the position of the row representation within the user interface.

The computing system accesses a table data structure representing a table having multiple rows and multiple columns. The resulting generated user interface includes multiple row visualizations, each representing a corresponding row of the table, such that at least some of the rows of the table have a corresponding row visualization. The user interface includes multiple regions. Row visualizations that satisfy value characteristic(s) for one or more columns are placed within a common region.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the displaying of data from a table in a manner that at least some of the rows are each represented with a row visualization, and in which the positioning of the row visualization conveys information regarding column values of the row. In particular, those row visualizations that correspond to rows in which one or more column values satisfy certain value characteristics are clustered within a common region. Thus, intuitive knowledge of the characteristics of the rows may be obtained by simply noticing the position of the row visualization within the user interface. In some cases, a given row representation may have a control that may be interacted with to show a more detailed row representation. Alternatively or in addition, a given region may have a control that may be interacted with to show further details regarding the rows represented within that region. Furthermore, the row visualization may have attributes that convey further information regarding other row values. For instance, color, size, shape, and so forth might visualize further information regarding row values.

First, a computing system will be described with respect to FIG. 1. Then, embodiments of the generation of the user interface will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
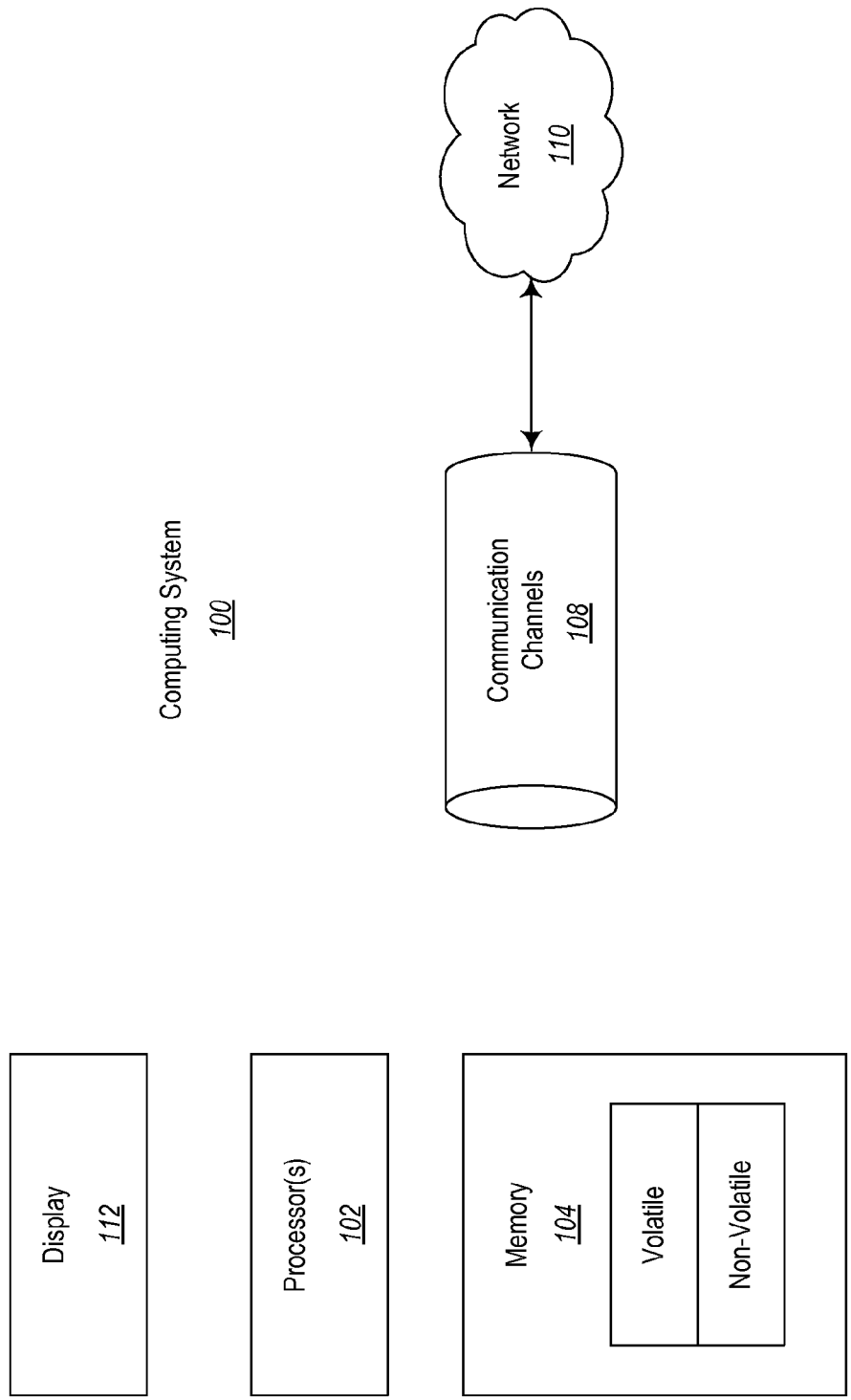
FIG. 1 abstractly illustrates a physical computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also may include a display 112 on which the user interfaces described herein may be displayed, although the principles described herein are not limited to the generation and display of the user interface being on the same computing system.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
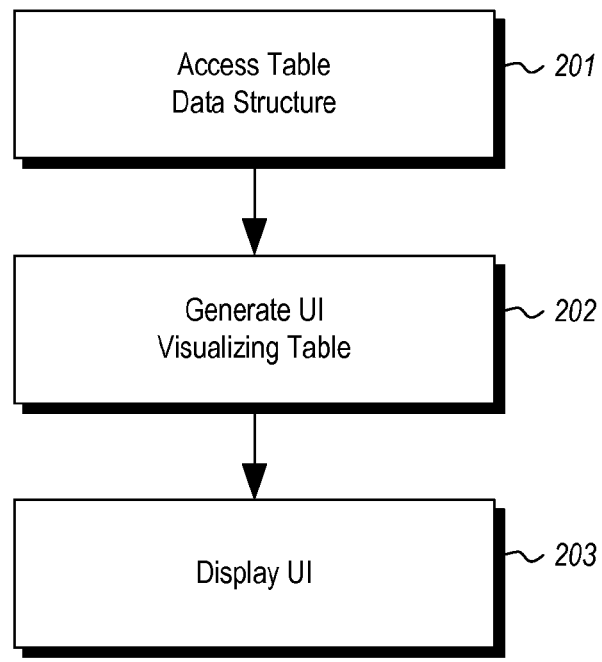
FIG. 2 illustrates a flowchart of a method for representing data from a table within a user interface.

FIG. 2 illustrates a flowchart of a method 200 for representing data from a table within a user interface. The method 200 is initiated by a computing system accessing a table data structure representing a table constituting multiple rows and multiple columns (act 201). The table data structure may be any type of data structure including a relational structure, an object, a group of objects, or any other form of data that represents a table having multiple rows and multiple columns. However, the principles described herein are not limited to the form or format of the table data structure. Referring to FIG. 1, for example, the computing system 100 may access a table data structure from the memory 104, or over the network 110 using communication channel 108.

Figure 3:
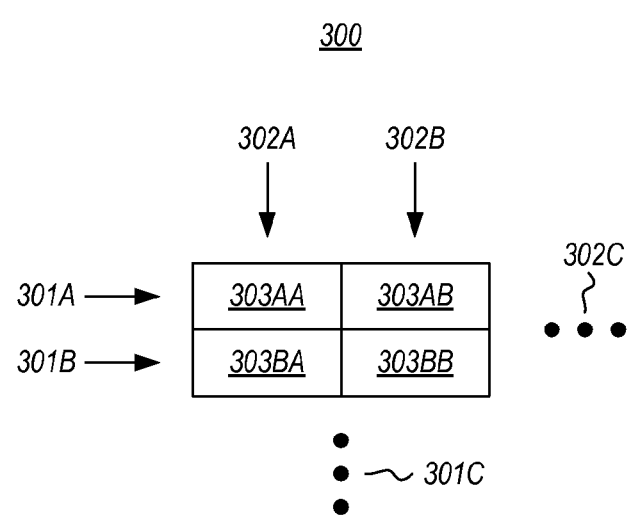
FIG. 3 illustrates a table that may be represented by a table data structure.

FIG. 3 illustrates a table 300 that may be represented by such a table data structure. The table includes multiple rows 301 and multiple columns 302. The example table includes two rows 301A and 301B, and two columns 302A and 302B, but the ellipses 301C and 302C represent that the principles described herein apply regardless of the number of rows and columns in the table represented by the table data structure. At the intersection of a row and column there is an entry. Accordingly, table 300 has corresponding entries 303AA, 303AB, 303BA and 303BB.

Referring to FIG. 2, the method 200 then includes generate a user interface for visualizing the table (act 202). The user interface may then be displayed (act 203). For instance, referring to FIG. 1, the computing system 100 may generate a user interface to visualize the table represented by the table data structure 300. The computing system 100 may then display that generated user interface on the display 112.

Figure 4:
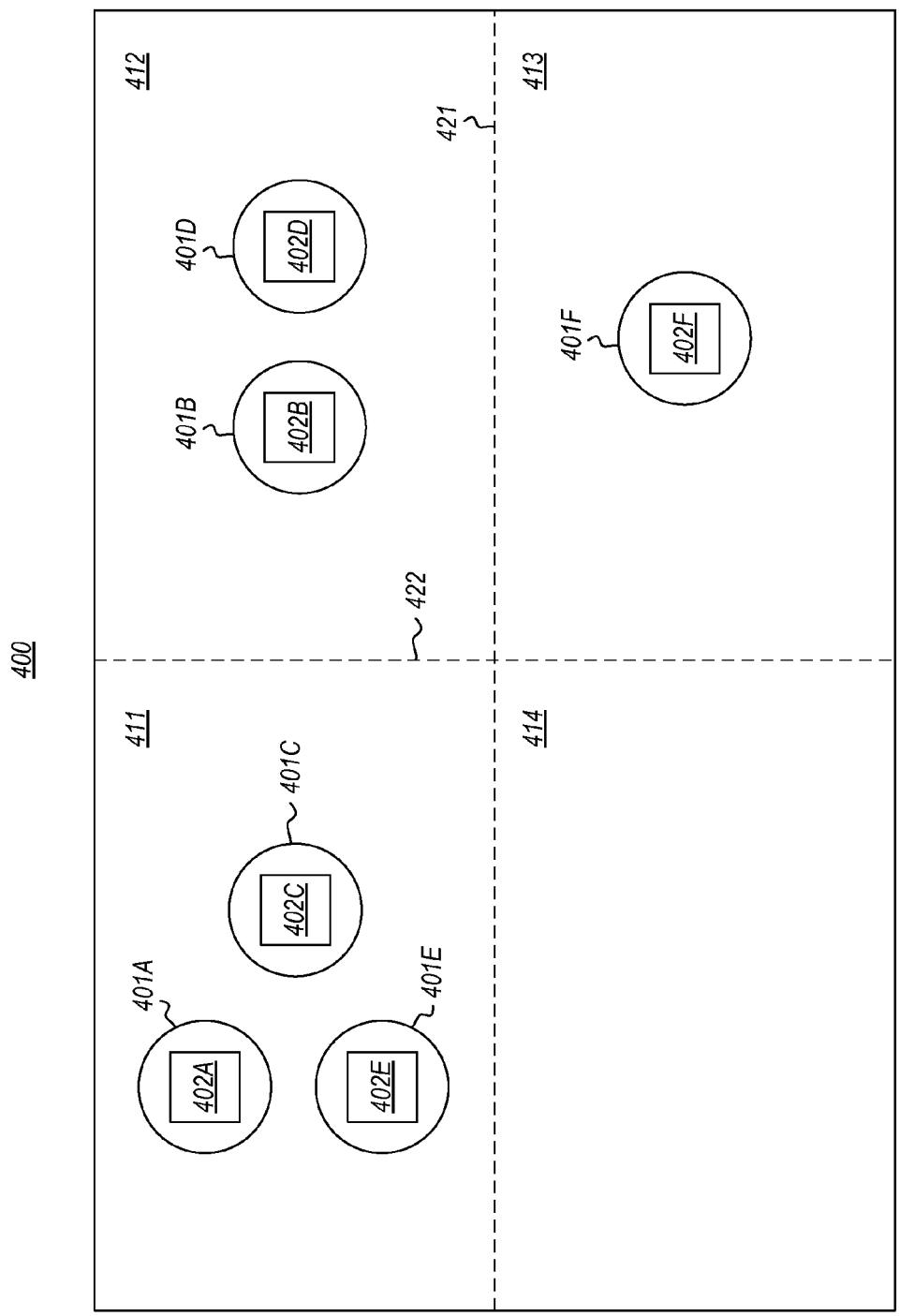
FIG. 4 abstractly illustrates a user interface that represents a general example of a visualization of the table of FIG. 3.

FIG. 4 abstractly illustrates a user interface 400 that represents an example of a visualization of table 300. The user interface 400 includes a row visualization corresponding to each row of the table 300. For instance, row visualization 401A (abstractly represented as a circle) corresponds to row 301A, and row visualization 401B corresponds to row 301B.

In a broader sense, the user interface may include row visualizations for all, or a subset, of the rows in the table. For instance, if there were 100 rows in a table, perhaps there would also be 100 row visualizations in the user interface, one row visualization corresponding to each row. However, there might only be 20 row visualizations in the user interface. In the example user interface 400, there are additional row visualizations 401C through 401F representing yet other rows not shown in the table 300 of FIG. 3.

The user interface 400 also includes four regions 411, 412, 413 and 414. Each region is visually associated with row visualizations corresponding to rows in which a column has a particular value of one or more characteristics. In this case, the visual association between row visualizations and the region is made by having the row visualization contained within the region.

For instance, suppose that the value of column 302A could be any integer from 1 to 100. Region 411 might contain row visualizations for any row in which the value of the entry at column 302A falls between 1 and 25, inclusive. Likewise, region 412 might contain row visualizations for any row in which the value of the entry at column 302A falls between 26 and 50, inclusive. In addition, region 413 might contain row visualizations for any row in which the value of the entry at column 302A falls between 51 and 75, inclusive. Finally, region 414 might contain row visualizations for any row in which the value of the entry at column 302A falls between 76 and 100, inclusive.

In the illustrated embodiment, the regions are shown separated by dashed lines 421 and 422. However, the principles described herein are not limited to embodiments in which the boundaries between regions include a boundary visualization expressly showing the boundary between regions.

Thus, visually inspecting the user interface, one can quickly infer that the value of entries for column 302A for the rows represented by row visualizations 401A, 401C and 401E have values that fall between 1 and 25 inclusive. Furthermore, one can quickly infer that the value of entries for column 302A for the rows represented by row visualizations 401B and 401D have values that fall between 26 and 50, inclusive. In addition, one can quickly infer that the value of the entry for column 302A for the row represented by row visualization 401F has a value that falls between 51 and 75, inclusive, and that there are no rows in the table in which the value of column 302A falls between 76 and 100, inclusive.

In this example, the "one or more value characteristics" was a single value characteristic in the form of a range of integer values. However, other example value characteristics might include matching on any property value. For instance, if each row corresponds to an employee, the various column values might correspond to particular properties of that employee. For instance, the property might be a citizenship, a date of hire, a salary, and work country, and so forth. In that case, row visualization in a particular region might represent table rows for all employees in which the citizenship property matches the value "Canada". Other examples of one or more value characteristics include the value falling within a certain range, have a value within a set of values, and so forth.

Optionally, at least some of the row visualizations include a visualization of a column value of a column not sorted into regions. For instance, the regions 411 through 414 sort the row visualizations on the value of column 302A. However, some or all of the row visualizations may contain an additional visualization representing the value of the column 302B for that row. For instance, this is abstractly represented in FIG. 4 in which row visualizations 401A through 401F are each shown as including visualization 402A through 402F, respectively. For instance, suppose each row in the table represented an employee, and the row visualization were sorted into regions according to citizenship. The row visualization might also show some representation of the salary of the employee.

This might be accomplished by, for example, including some text representation of the property (e.g., a text-based representation of the corresponding employee's salary). Alternatively or in addition, a color or shading of all or a portion of the row visualization might convey some information about salary. For instance, different colors of the visible spectrum of a rainbow may be used to represent different salary levels. As an example, purple (or light shading) might represent a relatively high salary, while red (or dark shading) might represent a relatively low salary. Alternatively or in addition, a size or shape of at least a portion of the row visualization might represent this salary information. For instance, large row visualizations might represent rows for employees with high salaries, while smaller row visualizations might represent rows for employees with low salaries. Alternatively or in addition, this might be represented by a progress indicator that shows a bar with a different fill level depending on salary. Any other visualization may suffice.

Having described a general example of a user interface with respect to FIG. 4, various specific examples, and further extensions of the principles, will be described with respect to the user interface examples of FIGS. 5 through 9.

Figure 5:
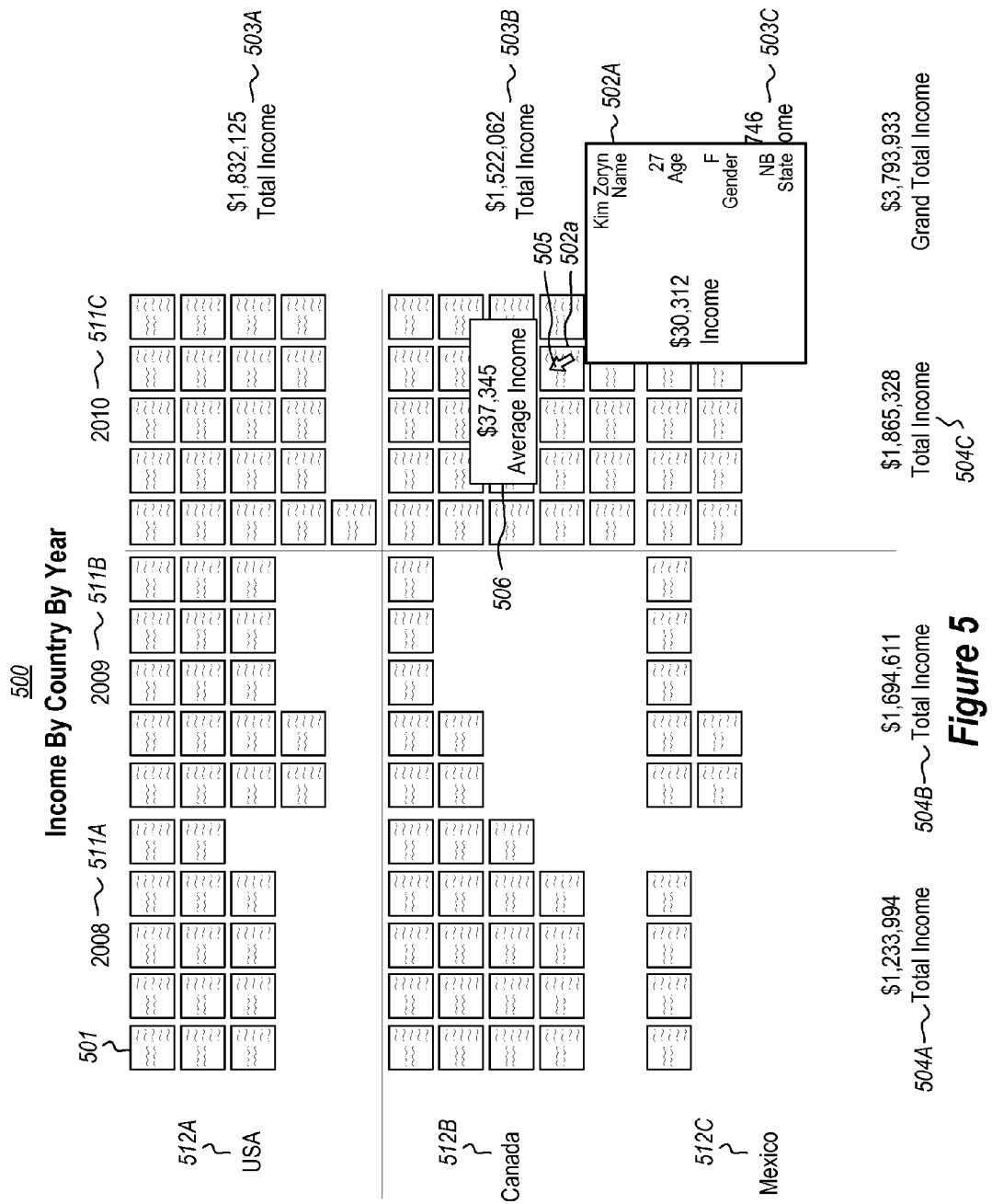
FIG. 5 illustrates a user interface that represents a first specific example of the user interface of FIG. 4.

FIG. 5 illustrates a user interface 500 that represents a specific example of the user interface 300 of FIG. 3. In this case, the underlying table (not illustrated) includes a row for each employee. Each column includes a corresponding property of the employee in a particular work year including 1) name, 2) income, 3) the subject year, 4) age, 5) gender, 6) work state in that year, and 7) work country in that year. In this case, the row visualization for each row is in the form of a square (see, for example, square 501).

In FIG. 5, the regions are defined by two table column values, rather than just one. For instance, there are nine regions. In the horizontal dimension, there are three regions sorted for each year going from 2008 to 2010 inclusive. In the vertical direction, there are three regions sorted for each country including United States, Canada, and Mexico. Thus, there are 3 country row regions and 3 year column regions. These rows and columns are not to be confused with the rows and columns for the underlying table itself. The country row regions and column regions merely define regions for placement of row visualizations depending on their underlying table column values. The intersection of these two dimensions of regions (the country row region and the year column region) creates 9 regions sorted by year and work country.

Each column region has an associated visualization 511A, 511B, and 511C (collectively "511") that is visually associated with the one or more value characteristics associated with the column (in this case, a year corresponding to each column). Likewise, each row region has an associated visualization 512A, 512B, and 512C (collectively "512") that is visually associated with the one or more value characteristics associated with the row (in this case, a country corresponding to each row). The visual association is made with the visualizations 511 appearing above their corresponding year column region, and with the visualization 512 appearing to the left of their corresponding country row region. The visualizations 511 are permanently associated with the corresponding year column regions, and country row regions, although not required. The visualizations 511 and 512 might perhaps just be temporarily displayed in the user interface, and shown upon detecting some user interaction.

By quick visual inspection, one can evaluate the data in a much deeper way that if the data remained in table format. For instance, the user can see that the number of employees has grown in the United States from 2008 to 2010. There were 14 employees in the United States in 2008, 17 in 2009, and 21 in 2010. The user can see that the number of employees has also grown in Mexico from 4 in 2008, to 7 in 2009, to 10 in 2010 (though some of the smaller row visualizations in the 2010/Mexico region of the user interface 500 are obscured by a more detailed row visualization 502A). One can also see that there is a strange anomaly in Canada whereby the number of employees dropped from 24 in 2008, to only 7 in 2009, and back up to 25 in 2010 (though some of the smaller row visualizations in the 2010/Canada region of the user interface 500 are obscured by the more detailed row visualization 502A). One can also quickly see that Mexico has relatively few employees in general as compared to the United States and Canada throughout all of 2008 through 2010, except for the anomaly in 2009 in Canada. Thus, more complex table analysis may be made using these sorted visualizations than would be available by directly viewing the table itself.

The user interface 500 reveals a number of features not yet described. For instance, the computing system has performed one or more calculations on the three country row regions. For instance, a total income calculation was performed for each country, and the result visualization is displayed for each in a manner associated with each country row. For instances, total income result visualizations 503A, 503B and 503C (collectively referred to as "503") are displayed next to each corresponding country row. Also, a total income calculation was performed for each year, and the result visualization is displayed for each in a manner associated with each year column region. For instances, total income result visualizations 504A, 504B and 504C (collectively referred to as "504") are displayed next to each corresponding year column.

In FIG. 5, suppose that the calculations that resulted in calculation result visualizations 503 and 504 may have been performed automatically as part of generating the user interface (act 202). In addition, the generation of the visualization of the calculation result may result in the user interface automatically as part of the generation of the user interface (act 202). Alternatively, the calculation result visualizations might be displayed after the user interface 500 is already displayed to the user. For instance, the user may interact with the user interface 500 to somehow cause the calculation result visualizations 503 and 504 to be inserted into the user interface.

For instance, by hovering a pointer 505 over a particular one of the 9 regions (e.g. the 2010/Canada region), perhaps a calculation result visualization 506 corresponding to that region is then displayed in the user interface. For instance, by hovering over the 2010/Canada region, a calculated result visualization 506 appears showing the average income for all employees for that year and country. The calculation of the average income for that year and country may be deferred until the user interaction with that region is detected, or may be performed in advance of that detection.

FIG. 5 also shows that a more detailed representation 502A of a row visualization 502a may be displayed upon detecting that a user has interacted with a control associated with the row visualization 502a. The more detailed representation may represent further information regarding that row. For instance, in more detailed representation 502A illustrates in text form the income, the name, the age, the gender and the state associated with that row.

In some embodiments, an entire region of the user interface may itself have a control, which may be interacted with in order to show a second user interface that shows further details regarding some or all of the row visualization that were contained within that region. For instance, referring to FIG. 5, suppose that each of the nine regions has an associated control in which the user may navigate the pointer 505 so that it appears inside of a region. The control might then be activated by selecting the pointer (e.g., pressing the left or right mouse control). For instance, suppose the user activates such a region control associated with the 2010/Canada, which contains 25 row visualizations. In response, the user interface 600 of FIG. 6 might appear.

The user interface 600 shows 25 more detailed row visualizations, each corresponding to one of the 25 smaller row visualizations of the 2010/Canada region of the user interface 500. Here, the income associated with each employee is represented in three different ways, two of which clearly shown in FIG. 6. First, the income may be indicated in text form. Second, the income may be represented by the size of the row visualization (e.g., where the area of the row visualization is proportional to income). Third, although not shown in FIG. 6, the row visualization may be shaded or colored differently depending on income. The name, age, gender, and state of each employee is also shown within the respective row visualization.

Note that the user interface 600 is also organized into regions. In this case, all of the row visualizations in the entire user interface are those row visualizations in which the work country value is Canada, and in which the year value is 2010. However, further regional organization is now made by state (or province in the case of Canada). For instance, the upper left quadrant contains row visualizations for employees working in Quebec (abbreviated as "QC") and thus which have a column value indicating Quebec in the appropriate state column. The upper right quadrant contains row visualizations for employees working in Ontario (abbreviated as "ON") and thus which have a column value indicating Ontario in the appropriate state column. The lower right quadrant contains row visualizations for employees working in British Columbia (abbreviated as "BC") and thus which have a column value indicating British Columbia in the appropriate state column. The lower left quadrant contains row visualizations for employees working in Alberta (abbreviated as "AB") and which thus have a column value indicating Alberta in the appropriate state column. Each of the regions is visually associated with a label (e.g., QC, ON, BC, AB) identifying the values against which the row visualization was sorted.

Immediate information can be derived by observing the features, contents, and position of the various row visualizations. For instance, salary amongst employees in British Columbia is fairly constant, whereas there is some disparity in salary in salary in Ontario, and large disparity in Quebec. In Alberta, there seems to be one moderately salaried employee, and a number of lower wage workers.

Figure 6:
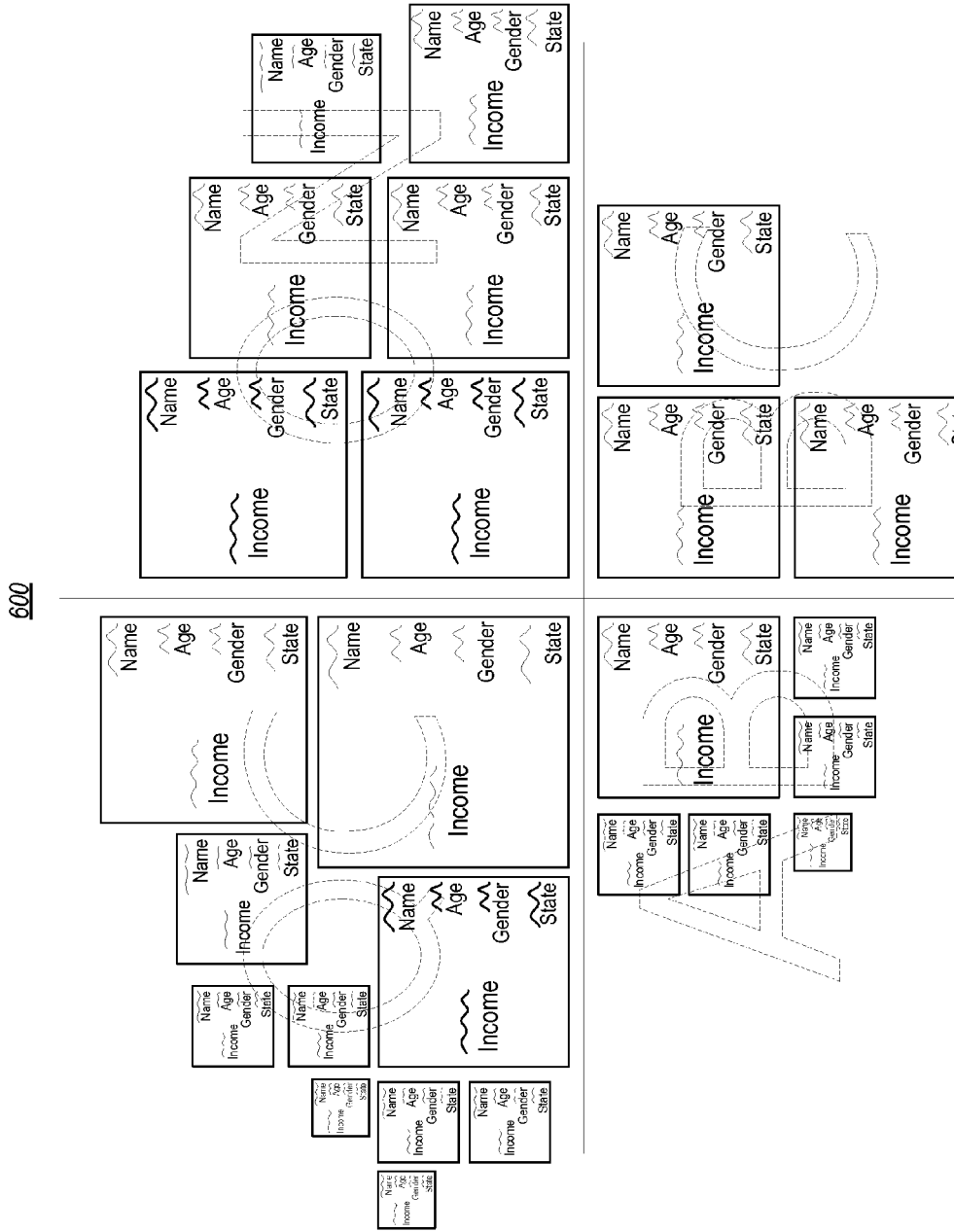
FIG. 6 illustrates a user interface that represents a second specific example of the user interface of FIG. 4.

Although not shown, FIG. 6 might have a control that allows the user to return to the user interface of FIG. 5. Thus, the user may toggle between FIG. 5 and the more detailed representations of each region (such as that represented by FIG. 6). This allows the user to dive deeply and quickly into the data, and return to the broader context as desired.

Figure 7:
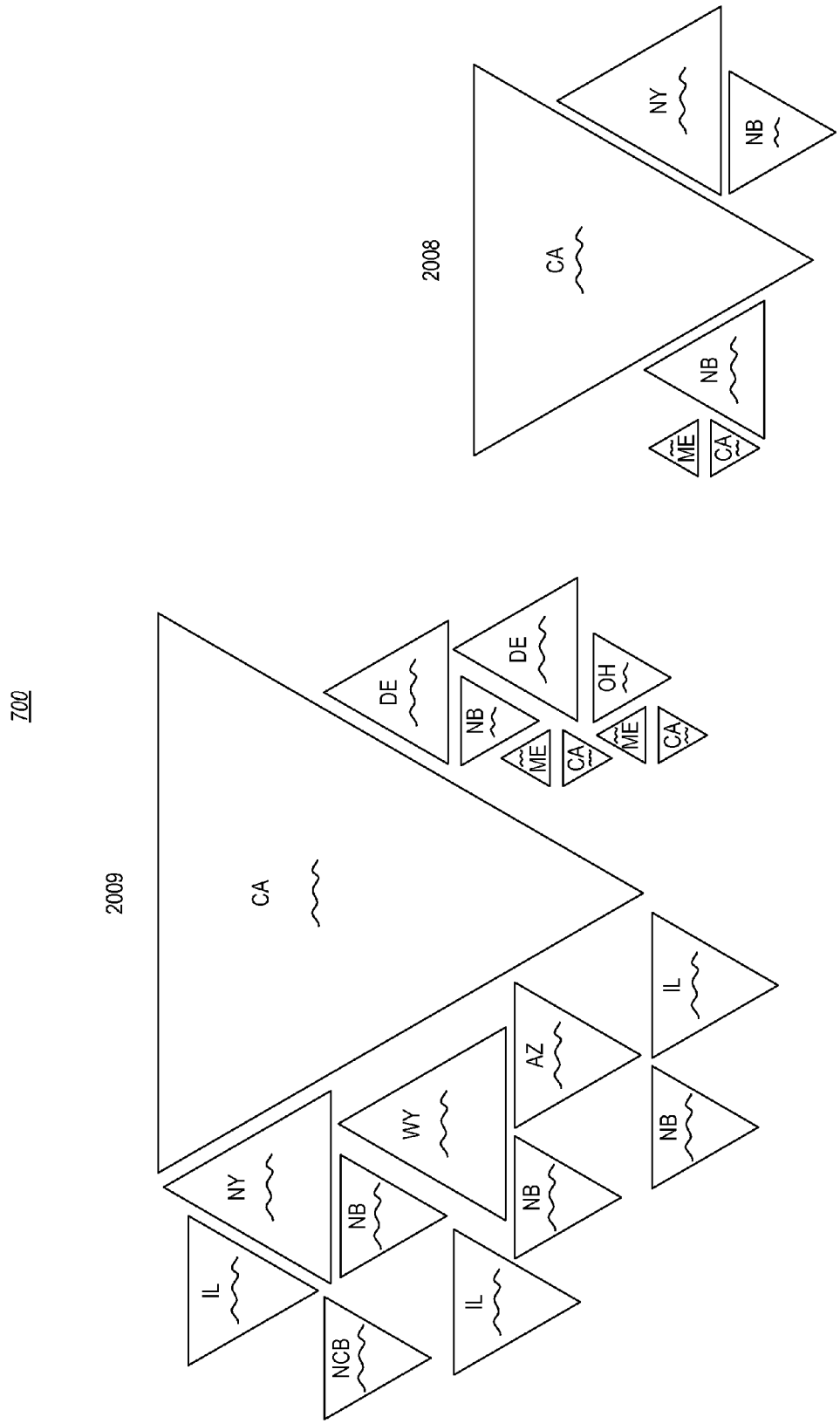
FIG. 7 illustrates a user interface that represents a third specific example of the user interface of FIG. 4.

FIG. 7 illustrates a user interface 700 that shows row visualizations from a different table. In this case, the table includes rows showing average salaries by state and year. Here, the row visualizations are sorted by year with the row entries having the year column of value 2009 being on the left side of the user interface 700, and row visualization having the year column of value 2008 being on the right side of the user interface 700. In this case, size, shading, and contained text of the row visualization may represent the salary column value. A calculation has been performed comparing 2008 and 2009 values by state. If the salaries increased, then this may be represented by an upward facing triangle, and vice versa.

Figure 8:
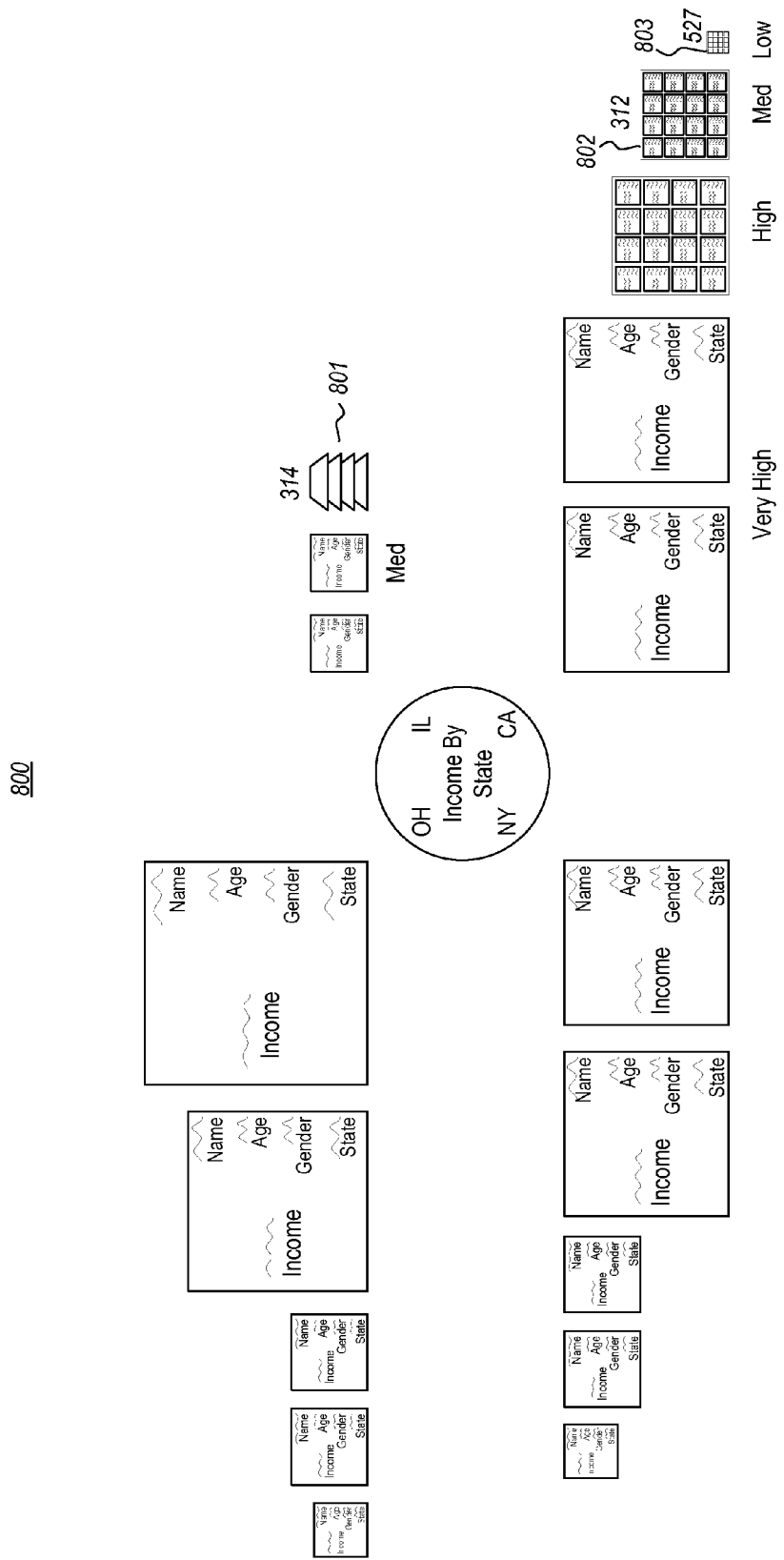
FIG. 8 illustrates a user interface that represents a fourth specific example of the user interface of FIG. 4.

FIG. 8 illustrates a user interface 800 that shows row visualization from yet another table. In this case, the regions are separated by state, and the size of the row visualization is proportional to income. However, here, there is a single visualization that might represent multiple rows that are not distinctly represented with their own row visualization. For instance, visualization 801 represents 314 rows, visualization 802 represents 312 rows, and visualization 803 represents 527 rows. These visualizations may be selected to narrow in on further information regarding these summarily represented rows. Such narrowing-in may cause some of the underlying rows to be distinctly visualized using a distinct row visualization.

Figure 9:
FIG. 9 illustrates a user interface that represents a fifth specific example of the user interface of FIG. 4.

FIG. 9 illustrates a user interface 900 in that shows row visualization from another table. In this case, the regions are separated by degree level. Furthermore, information regarding salary can be inferred from radial position. Here, a quick visual inspection shows a correlation between level of education and salary.

Accordingly, the principles described herein allow tables to be represented in a manner that information may be more intuitively extracted by sorting row visualizations by certain value(s) of the row. Furthermore, in some embodiments, the characteristics, position, and/or content of the row visualization may intuitively suggest even more information regarding that row.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for representing data from a table within a user interface, the method comprising:
   accessing a table data structure constituting a plurality of rows and a plurality of columns, and generating a user interface visualizing the table data structure, including:
      identifying a particular one of the plurality of columns for use in sorting the plurality of rows into a plurality of regions of the user interface;
      identifying a plurality of different unique sets of values of the particular column within the table data structure, the plurality of different unique sets of values being equal in number to the plurality of regions;
      assigning each of the plurality of different unique sets of values to a different one of the plurality of regions;
      arranging the plurality of regions within at least two dimensions of the user interface, the arrangement being based on the particular one of the plurality of columns and without consideration for an other of the plurality of columns, including arranging at least two of the regions along a first dimension of the user interface, and arranging at least two of the regions along a second, different, dimension of the user interface; and
      displaying a visual representation of each of the plurality of rows in a corresponding one of the plurality of regions, including, for each of the plurality of rows:
         identifying a value of the particular column within said row;
         identifying a particular one of the plurality of different unique sets of values to which the value belongs; and
         generating the visual representation of said row within the region to which the particular one of the plurality of different unique sets of values is assigned.

2. The method in accordance with claim 1, wherein the visualization of at least one of the plurality of rows includes a visualization of a column value of a column other than the particular one of the plurality of columns.

3. The method in accordance with claim 2, wherein the visualization of the column value is a text representation.

4. The method in accordance with claim 2, wherein the visualization of the column value is a color or shading.

5. The method in accordance with claim 2, wherein the visualization of the column value is a size or shape of at least a portion of the visualization of the at least one of the plurality of rows.

6. The method in accordance with claim 2, wherein the visualization of the column value comprises a progress indicator.

7. The method in accordance with claim 1, further comprising:
   performing one or more calculations on a plurality of rows that are visualized within a particular one of the plurality of regions.

8. The method in accordance with claim 7, wherein the user interface further comprises a visualization of the result of the one or more calculations.

9. The method in accordance with claim 8, wherein the one or more calculations are performed automatically as part of the generation of the user interface, and the generation of the visualization of the result in the user interface also occurs automatically as part of the generation of the user interface.

10. The method in accordance with claim 8, wherein the generation of the visualization of the result occurs after the user interface is displayed in response to user interaction with the user interface.

11. The method in accordance with claim 7, wherein the one or more calculations are performed after the user interface is displayed in response to user interaction with the user interface.

12. The method in accordance with claim 1, wherein at least one visual representation of one of the plurality of rows includes a control that may be interacted with in order to display a more detailed representation of data of the row.

13. The method in accordance with claim 1, the user interface further containing:
   a boundary visualization representing boundaries between the plurality of regions.

14. The method in accordance with claim 1, wherein the plurality of regions are arranged arbitrarily within the user interface.

15. The one or more hardware storage devices of claim 14, wherein the plurality of regions are arranged arbitrarily within the user interface.

16. A computer system, comprising:
   one or more processors; and
   one or more hardware storage devices having stored thereon computer-executable instructions that, when executed by the one or more processors, cause the computer system to instantiate a plurality of modules, including:
an access module that accesses a table data structure constituting a plurality of rows and a plurality of columns; and
a user interface generation module that generates a user interface visualizing the table data structure, by at least:
identifying a particular one of the plurality of columns for use in sorting the plurality of rows into a plurality of regions of the user interface;
identifying a plurality of different unique sets of values of the particular column within the table data structure, the plurality of different unique sets of values being equal in number to the plurality of regions;
assigning each of the plurality of different unique sets of values to a different one of the plurality of regions;
arranging the plurality of regions within at least two dimensions of the user interface, the arrangement being based on the particular one of the plurality of columns and without consideration for any other of the plurality of columns, including arranging at least two of the regions along a first dimension of the user interface, and arranging at least two of the regions along a second, different, dimension of the user interface; and
displaying a visual representation of each of the plurality of rows in a corresponding one of the plurality of regions, including, for each of the plurality of rows:
identifying a value of the particular column within said row;
identifying a particular one of the plurality of different unique sets of values to which the value belongs; and
generating the visual representation of said row within the region to which the particular one of the plurality of different unique sets of values is assigned.

17. The computer system of claim 16, wherein the visualization of at least one of the plurality of rows includes a visualization of a column value of a column other than the particular one of the plurality of columns.

18. The computer system of claim 16, wherein the visualization of the column value is a text representation.

19. The computer system of claim 16, wherein the plurality of regions are arranged arbitrarily within the user interface.

20. One or more hardware storage devices having stored thereon computer-executable instructions that, when executed by one or more processors of a computer system, cause the computer system to instantiate a plurality of modules, including:
an access module that accesses a table data structure constituting a plurality of rows and a plurality of columns; and
a user interface generation module that generates a user interface visualizing the table data structure, by at least:
identifying a particular one of the plurality of columns for use in sorting the plurality of rows into a plurality of regions of the user interface;
identifying a plurality of different unique sets of values of the particular column within the table data structure, the plurality of different unique sets of values being equal in number to the plurality of regions;
assigning each of the plurality of different unique sets of values to a different one of the plurality of regions;
arranging the plurality of regions within at least two dimensions of the user interface, the arrangement being based on the particular one of the plurality of columns and without consideration for any other of the plurality of columns, including arranging at least two of the regions along a first dimension of the user interface, and arranging at least two of the regions along a second, different, dimension of the user interface; and
displaying a visual representation of each of the plurality of rows in a corresponding one of the plurality of regions, including, for each of the plurality of rows:
identifying a value of the particular column within said row;
identifying a particular one of the plurality of different unique sets of values to which the value belongs; and
generating the visual representation of said row within the region to which the particular one of the plurality of different unique sets of values is assigned.

* * * * *